United States Patent [19]
Frank

[11] 3,932,808

[45] Jan. 13, 1976

[54] POWER FACTOR CORRECTING MEANS

[75] Inventor: Kjell Frank, Vasteras, Sweden

[73] Assignee: Allmanna Svenska Elektriska Aktiebolaget, Vasteras, Sweden

[22] Filed: Nov. 21, 1974

[21] Appl. No.: 526,069

[30] Foreign Application Priority Data
Dec. 13, 1973 Sweden .............................. 7316835

[52] U.S. Cl. ................ 323/102; 323/105; 323/110; 323/119; 323/124
[51] Int. Cl.² .......................................... G05F 1/68
[58] Field of Search............ 317/9 PF; 323/102, 105, 323/109, 110, 119, 124; 333/80 T

[56] References Cited
UNITED STATES PATENTS

| | | | |
|---|---|---|---|
| 3,400,326 | 9/1968 | Zhukov et al. ................... | 323/119 X |
| 3,551,799 | 12/1970 | Koppelmann ..................... | 323/127 X |
| 3,768,001 | 10/1973 | Thorborg ........................... | 323/102 |
| 3,842,342 | 10/1974 | Friedlander et al. ............ | 323/110 X |

FOREIGN PATENTS OR APPLICATIONS

| | | | |
|---|---|---|---|
| 1,230,830 | 5/1971 | United Kingdom................ | 323/102 |

*Primary Examiner*—William M. Shoop

[57] ABSTRACT

A power factor correcting means for connection to an AC voltage network includes a transformer with high voltage terminals for connection to the network and low voltage terminals. A capacitor battery is provided for connection to the network, and a controllable inductive element is connected to the low voltage terminal of the transformer. The capacitor battery includes a first part connected to the high voltage terminal of the transformer, and a second part connected to the low voltage terminal of the transformer. The total rated power of the capacitor battery is substantially as great as the maximum reactive power of the inductive element, and the rated power of the second portion of the capacitor battery is between 0.3 and 0.7 times as the maximum reactive power of the inductive element.

4 Claims, 5 Drawing Figures

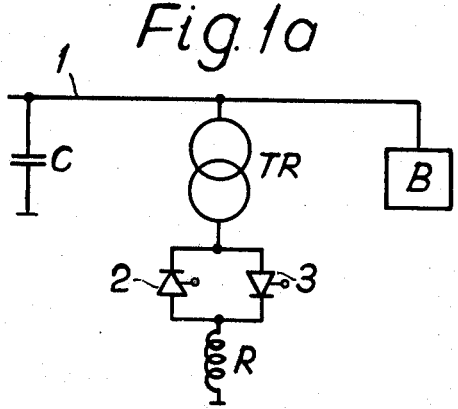
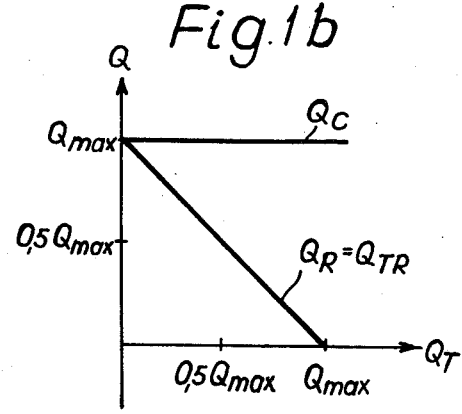
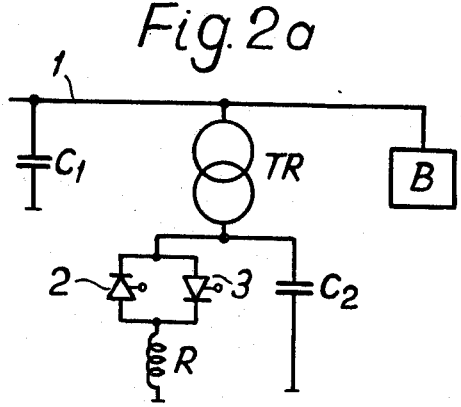
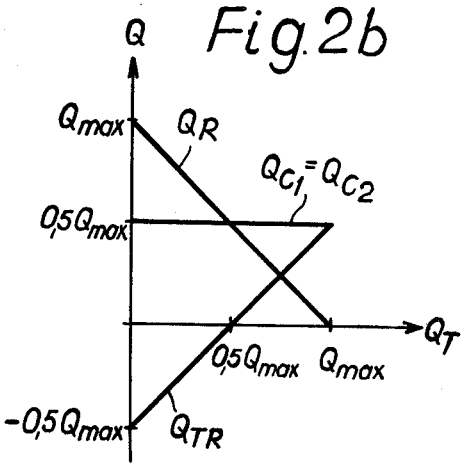
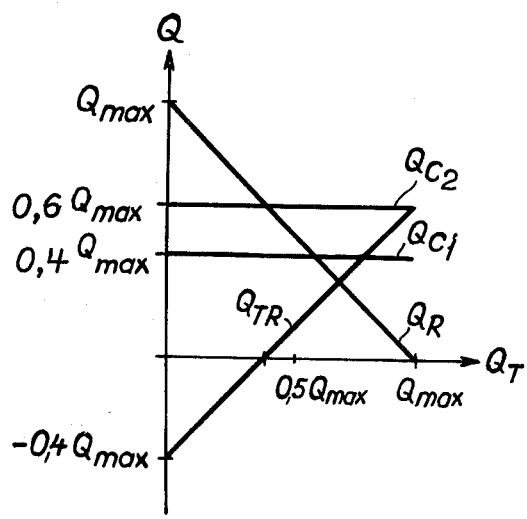

POWER FACTOR CORRECTING MEANS

BACKGROUND OF THE INVENTION

1. Field of the Invention

The present invention relates to a device for power factor correction for connection to an AC voltage network, comprising a transformer with, on the one hand, high-voltage terminals for connection to the network and, on the other, low-voltage terminals, a capacitor battery for connection to the network, and a controllable inductive element connected to the low-voltage terminal of the transformer.

2. The Prior Art

FIG. 1a shows a known arrangement of this type. To an AC voltage network 1 there is connected a capacitor battery C. To the network there is also connected a reactor R by way of a transformer TR. The current through the reactor can be controlled continuously between zero and the rated current by phase angle control of the anti-parallel-connected thyristors 2 and 3 connected in series with the reactor. The transformer steps down the mains voltage to a lower working level suitable for the thyristors and the reactor. Arrangements of this type are used for compensating the reactive power consumed by load objects B connected to the network 1. The capacitor C generates reactive power, and this reduces the total reactive power taken from the network. The reactive power consumption of the load object frequently varies, and it is then desirable that the reactive power generated by the power factor correcting means should correspond at each moment as closely as possible to the reactive power consumed by the load object.

This is achieved in the device according to FIG. 1a. Its mode of operation is shown in FIG. 1b. The reactive power consumption of the load object is expected to vary between zero and a maximum value $Q_{max}$. If full compensation is to be obtained, at each moment the rated powers (rated voltage × rated current) of the capacitor battery and the reactors are chosen to be equal to $Q_{max}$. FIG. 1b shows the reactive powers, $Q_C$ and $Q_R$, respectively, of the capacitor battery and the reactor as functions of the total inductive power $Q_T$ generated by the correcting device. The reactive power $Q_{TR}$ flowing through the transformer is of course equal to $Q_R$, and the rated power of the transformer is $Q_{max}$. In general $Q_T$ will be lower than $Q_{max}$, in certain typical modes of operation (such as correction of arc furnaces) essentially lower. As a rule, therefore, a considerable amount of power ($Q_{TR}$) flows through the transformer, the losses of which will therefore be relatively high.

SUMMARY OF THE INVENTION

The invention is constructed to provide a power factor or correcting arrangement in which the rated power and losses of the transformer are considerably lower than in earlier known arrangements, thus achieving a considerable reduction of the purchase price and operating costs of the arrangement.

According to the invention, a reactor is connected to the network by two anti-parallel-connected thyristors and a transformer. A capacitor battery has a first portion which is connected to the high voltage terminal of the transformer and a second portion which is connected to the low voltage terminal of the transformer. The total rated power of the capacitor battery is substantially as great as the maximum reactive power of the inductive element, and the rated portion of the second part of the capacitor battery is between 0.3 and 0.7 times as great as the maximum reactive power of the inductive element.

BRIEF DESCRIPTION OF THE DRAWINGS

In the following the invention will be explained with reference to the accompanying FIGS. 1 and 2, in which FIG. 1, as already mentioned, shows a previously known device, FIG. 2a a device according to the invention and FIGS. 2b and 2c the power ratios in such a device.

DESCRIPTION OF THE PREFERRED EMBODIMENTS

In the device according to FIG. 2a, the reactor R is connected to the network 1 by way of the two anti-parallel-connected thyristors 2 and 3 and the transformer TR. A capacitor battery has a first portion $C_1$, which is connected to the high-voltage terminal of the transformer, and a second portion $C_2$ which is connected to the low-voltage terminal of the transformer. As mentioned in connection with FIG. 1, the maximum requirement of reactive compensating power is assumed to be $Q_{max}$, and the total generated reactive power ($Q_T$) of the device is desired to be variable between zero and $Q_{max}$. The rated power of each of $C_1$ and $C_2$ can then be chosen to be equal to $0.5\ Q_{max}$, and the rated power of the reactor R is then chosen to be $Q_{max}$.

In FIG. 2b the reactive powers flowing through the reactor ($Q_R$), the capacitor batteries ($Q_{C_1}$ and $Q_{C_2}$) and the transformer ($Q_{TR}$) are shown as functions of the total generated reactive power $Q_T$ of the device. As will be seen from the diagram, $Q_{TR}$ reaches a maximum of $0.5\ Q_{max}$, and the rated power of the transformer is therefore chosen to have this value, which is only half of the required rated power of the transformer in the previously known arrangement according to FIG. 1. In this way a considerable reduction of the price and space requirements of the arrangement is achieved.

$Q_T$ can be assumed to vary more or less at random and will only seldom lie at the extreme values zero or $Q_{max}$. As a rule, the power $Q_{TR}$ flowing through the transformer will therefore be considerably lower than $0.5\ Q_{max}$ and for a considerable part of the time it will be relatively close to zero. Since the load losses of the transformer vary with the square of $Q_{TR}$, a very strong reduction of the transformer losses and thus of the operating costs of the device is obtained in an arrangement according to the invention.

In the foregoing it was assumed that $C_1$ and $C_2$ had rated powers of equal magnitude. In some cases, for example when the load object B is an arc furnace, the need of compensating power ($Q_T$) lies at a value which is less than $0.5\ Q_{max}$ for the greater part of the time, and $Q_T$ reaches $Q_{max}$ only seldom and for short periods. It may then be advantageous to choose the rated power of $C_2$ to be somewhat higher than $0.5\ Q_{max}$, for example $0.6\ Q_{max}$, and to give the rated power of $C_1$ a correspondingly lower value, such as $0.4\ Q_{max}$. FIG. 2c shows the power flows for this case. As will be seen, $Q_{TR} = Q_{C_2} - Q_R$ will be equal to zero when $Q_T = 0.4\ Q_{max}$. The maximum power through the transformer will be somewhat higher here, $0.6\ Q_{max}$, than when dimensioning according to FIG. 2b. Since the maximum power probably occurs only seldom and for short periods, the rated power of the transformer need not be higher than $0.5 Q_{max}$ provided it has a sufficient overload capacity.

As is clear from the above examples, the rated power of the transformer will be lowest if the rated power of the capacitor battery $C_2$ is half the rated power of the reactor R. The transformer losses, however, will be lowest if $C_2$ is chosen so that $Q_{TR}$ is as close to zero as possible for as great a part of the operating time as possible. The dimensioning of $C_2$ therefore depends on how transformer losses and acquisition costs are evaluated in each individual case. However, it has been found that in practice the best possible result is obtained if the rated power of $C_2$ is chosen within the range of from 0.3 to 0.7 times the rated power of the reactor R.

As is clear from the above, the total rated power of the capacitor batteries is determined by the maximum need of compensating power. The rated power of the reactor is determined by the magnitude of the interval within which it is desirable to control the compensating power. The rated power of the battery ($C_2$) connected on the low-voltage terminal of the transformer is determined by the rated power of the reactor and, if consideration is only paid to minimizing of the rated power of the transformer, it will be half of the rated power of the reactor. The rated power of the capacitor battery ($C_1$) connected on the high-voltage terminal of the transformer is the difference between the maximum need of compensating power and the rated power of the capacitor battery $C_2$.

If, for example, the maximum need of compensating power is 1 MVAr and it is desirable to control the power between 0.4 and 1 MVAr, the rated power of the reactor is chosen to be 0.6 MVA. The rated power of the capacitor battery $C_2$ can then be chosen to be, for example, 0.3 MVA, which provides the lowest possible rated power for the transformer (0.3 MVA). The rated power of the capacitor battery $C_1$ will then be $1 - 0.3 = 0.7$ MVA.

Instead of the reactor R and the phase angle-controlled rectifiers 2 and 3 it is of course possible to use other types of controllable inductive elements. One example of such an element is a reactor battery in which each reactor can be switched on and off with the help of a mechanical switch or a semiconductor contactor. Another example is a static convertor, the DC side of which is short-circuited over a reactor, and which is controlled with a control angle which is close to 90°.

I claim:

1. Power factor correcting means for connection to an AC voltage network (1) comprising a transformer (TR) with high-voltage terminals for connection to the network and low-voltage terminals, a capacitor battery ($C_1$, $C_2$) for connection to the network, and a controllable inductive element (R, 2, 3) connected to the low-voltage terminal of the transformer, in which the capacitor battery comprises a first part ($C_1$) connected to the high-voltage terminal of the transformer and a second part ($C_2$) connected to the low-voltage terminal of the transformer, and in which the rated power of the second portion ($C_2$) of the capacitor battery is between 0.3 and 0.7 times as great as the maximum reactive power of the inductive element.

2. Power factor correcting memans according to claim 1, in which the total rated power of the capacitor battery is substantially as great as the maximum reactive power of the inductive element.

3. Power factor correcting means according to claim 1, in which the rated power of the second portion ($C_2$) of the capacitor battery is half as great as the maximum reactive power of the inductive element.

4. Power factor correcting means according to claim 1, in which the two portions of the capacitor battery have rated powers of substantially the same magnitude.

* * * * *